United States Patent
Aggarwal et al.

(10) Patent No.: US 10,331,671 B2
(45) Date of Patent: *Jun. 25, 2019

(54) AUTOMATED OUTLIER DETECTION

(71) Applicant: INTERNATIONAL BUSINESS MACHINES CORPORATION, Armonk, NY (US)

(72) Inventors: Charu Aggarwal, Yorktown Heights, NY (US); Yanjie Fu, Newark, NJ (US); Srinivasan Parthasarathy, White Plains, NY (US); Deepak Turaga, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,426

(22) Filed: May 25, 2018

(65) Prior Publication Data

US 2018/0300371 A1    Oct. 18, 2018

Related U.S. Application Data

(63) Continuation of application No. 15/385,085, filed on Dec. 20, 2016, now Pat. No. 10,031,945, which is a
(Continued)

(51) Int. Cl.
*G06F 16/2455*  (2019.01)
*G06F 16/248*   (2019.01)
(Continued)

(52) U.S. Cl.
CPC ........ *G06F 16/2455* (2019.01); *G06F 16/248* (2019.01); *G06F 16/2465* (2019.01);
(Continued)

(58) Field of Classification Search
None
See application file for complete search history.

(56) References Cited

U.S. PATENT DOCUMENTS

| 9,576,031 B1 | 2/2017 | Aggarwal et al. |
| 2010/0194742 A1* | 8/2010 | Lecerf .................. G06T 11/203 345/419 |

(Continued)

OTHER PUBLICATIONS

List of IBM Patents or Patent Applications Treated as Related; (Appendix P), Filed May 25, 2018; pp. 1-2.

*Primary Examiner* — Wilson Lee
(74) *Attorney, Agent, or Firm* — Cantor Colburn LLP; Kurt Goudy

(57) ABSTRACT

An automated outlier detection system implements an unsupervised set of processes to determine feature subspaces from a dataset; determine candidate exploratory actions, where each candidate exploratory action is a specific combination of a feature subspace and a parameterized instance of an outlier detection algorithm; and identify a set of optimal exploratory actions to recommend for execution on the dataset from among the candidate exploratory actions. Outlier scores obtained as a result of execution of the set of optimal exploratory actions are processed to obtain one or more outlier views such that each outlier view represents a consistent characterization of outliers by each optimal exploratory action corresponding to that outlier view.

15 Claims, 4 Drawing Sheets

Related U.S. Application Data continuation of application No. 15/018,016, filed on Feb. 8, 2016, now Pat. No. 9,576,031.

(51) Int. Cl.
  *G06F 16/25*    (2019.01)
  *G06F 16/2458*   (2019.01)
  *G06K 9/62*    (2006.01)

(52) U.S. Cl.
  CPC ........... *G06F 16/252* (2019.01); *G06K 9/623* (2013.01); *G06K 9/6215* (2013.01); *G06K 9/6232* (2013.01); *G06K 9/6284* (2013.01)

(56) References Cited

U.S. PATENT DOCUMENTS

| | | | |
|---|---|---|---|
| 2013/0317889 A1* | 11/2013 | Narayanan | G06Q 10/06375 705/7.37 |
| 2015/0379427 A1* | 12/2015 | Dirac | G06N 99/005 706/12 |
| 2017/0228432 A1 | 8/2017 | Aggarwal et al. | |

\* cited by examiner

AUTOMATED OUTLIER DETECTION

PRIORITY

This application is a continuation of and claims priority from U.S. patent application Ser. No. 15/385,085, titled "AUTOMATED OUTLIER DETECTION", filed on Dec. 20, 2016, which is a continuation of and claims priority from U.S. application Ser. No. 15/018,016, titled "AUTOMATED OUTLIER DETECTION", filed on Feb. 8, 2016, which is now U.S. Pat. No. 9,576,031; the entire contents of each application are incorporated herein by reference in their entirety.

STATEMENT REGARDING FEDERALLY SPONSORED RESEARCH OR DEVELOPMENT

This invention was made with Government support under contract number H98230-14-D-0038 awarded by the Department of Defense. The Government has certain rights to this invention.

BACKGROUND

Conventional approaches for detecting outliers in a dataset involve manual or brute-force analysis of the dataset to identify optimal combinations of features, algorithms, algorithm parameters, or the like for detecting the outliers. Navigating the available choices of features, algorithms, algorithm parameters, or the like and assessing the trade-offs associated with such choices can be a daunting task using conventional approaches to outlier detection, particularly when operating under time and budget constraints. Technical solutions that address at least some of the drawbacks associated with traditional approaches to outlier detection are described herein.

SUMMARY

In one or more example embodiments of the disclosure, a method is disclosed that includes determining, by a computer processor, a set of one or more features associated with a dataset; determining, by the computer processor, a set of one or more feature subspaces, wherein each feature subspace comprises a respective at least one feature from the set of one or more features; determining, by the computer processor, a set of one or more candidate exploratory actions, wherein each candidate exploratory action comprises a respective feature subspace and a respective instance of a respective outlier detection algorithm; determining, by the computer processor, an optimal subset of one or more exploratory actions from among the set of one or more candidate exploratory actions; executing, by the computer processor, at least one exploratory action in the optimal subset to obtain outlier data; processing, by the computer processor, the outlier data to obtain one or more outlier views; and presenting, by the computer processor, the one or more outlier views via one or more user interfaces.

In one or more other example embodiments of the disclosure, a system is disclosed that includes at least one memory storing computer-executable instructions; and at least one processor configured to access the at least one memory and execute the computer-executable instructions to: determine a set of one or more features associated with a dataset; determine a set of one or more feature subspaces, wherein each feature subspace comprises a respective at least one feature from the set of one or more features; determine a set of one or more candidate exploratory actions, wherein each candidate exploratory action comprises a respective feature subspace and a respective instance of a respective outlier detection algorithm; determine an optimal subset of one or more exploratory actions from among the set of one or more candidate exploratory actions; execute at least one exploratory action in the optimal subset to obtain outlier data; process the outlier data to obtain one or more outlier views; and present the one or more outlier views via one or more user interfaces.

In one or more other example embodiments of the disclosure, a computer program product is disclosed that comprises a non-transitory storage medium readable by a processing circuit, the storage medium storing instructions executable by the processing circuit to cause a method to be performed, the method comprising: determining a set of one or more features associated with a dataset; determining set of one or more feature subspaces, wherein each feature subspace comprises a respective at least one feature from the set of one or more features; determining a set of one or more candidate exploratory actions, wherein each candidate exploratory action comprises a respective feature subspace and a respective instance of a respective outlier detection algorithm; determining an optimal subset of one or more exploratory actions from among the set of one or more candidate exploratory actions; executing at least one exploratory action in the optimal subset to obtain outlier data; processing the outlier data to obtain one or more outlier views; and presenting the one or more outlier views via one or more user interfaces.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Illustrative Outlier Detection System and Processes

Figure 1:
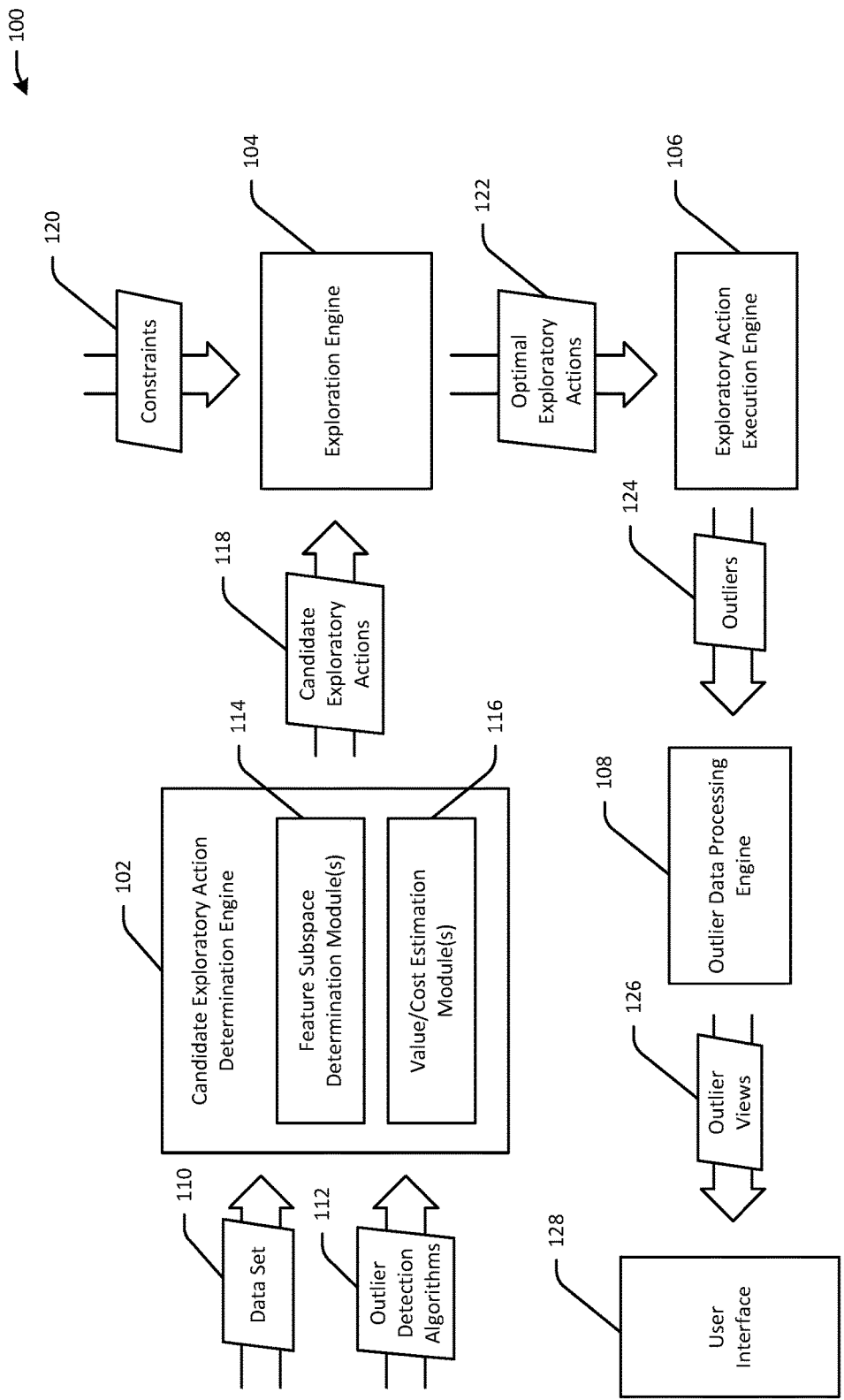
FIG. 1 schematically depicts a system configured to perform various outlier detection processes in accordance with one or more example embodiments of the disclosure.
Figure 2:
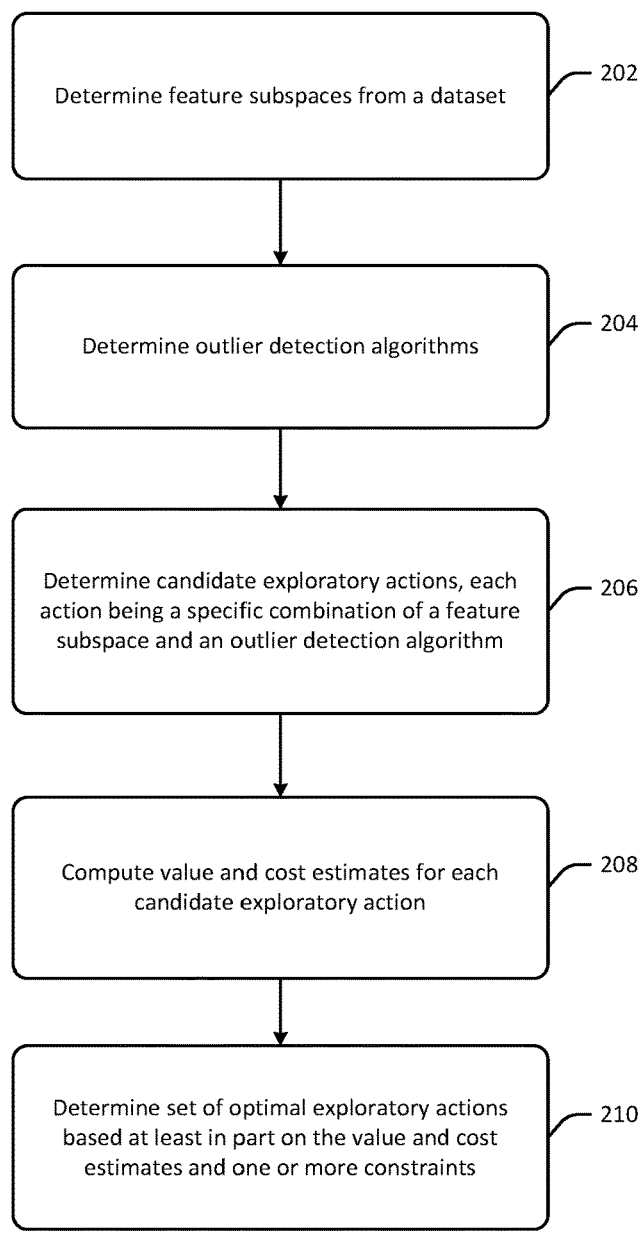
FIG. 2 is a process flow diagram of an illustrative method for determining a set of optimal exploratory actions from a set of candidate exploratory actions in accordance with one or more example embodiments of the disclosure.
Figure 3:
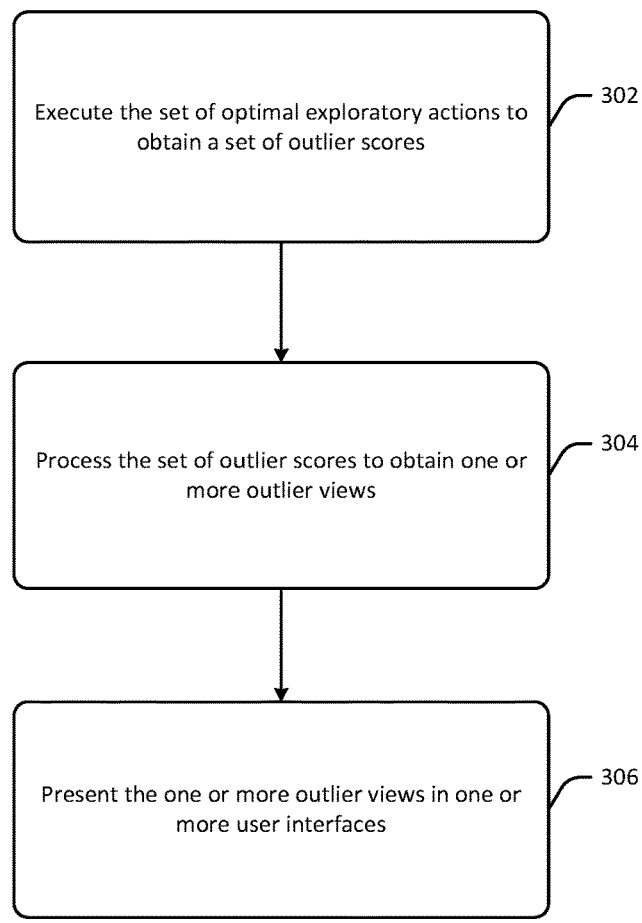
FIG. 3 is a process flow diagram of an illustrative method for executing a set of optimal exploratory actions to obtain outlier data and processing the outlier data to obtain outlier views in accordance with one or more example embodiments of the disclosure.

FIG. 1 schematically depicts a system configured to perform various outlier detection processes in accordance with one or more example embodiments of the disclosure. FIG. 2 is a process flow diagram of an illustrative method 200 for determining a set of optimal exploratory actions from a set of candidate exploratory actions in accordance with one or more example embodiments of the disclosure. FIG. 3 is a process flow diagram of an illustrative method 300 for executing a set of optimal exploratory actions to obtain outlier data and processing the outlier data to obtain outlier views in accordance with one or more example embodiments of the disclosure. FIG. 1 will be described hereinafter in conjunction with FIGS. 2 and 3.

Referring first to FIG. 1, an outlier detection system 100 is depicted. The outlier detection system 100 may include various engines configured to perform various operations. For example, the outlier detection system 100 may include, without limitation, a candidate exploratory action determination engine 102, an exploration engine 104, an exploratory action execution engine 106, and an outlier data processing engine 108. Each engine of the outlier detection system 100 may include computer-executable instructions, code, or the like that responsive to execution by a processing circuit (e.g., one or more processing units) may cause one or more corresponding operations to be performed. In certain example embodiments, an engine may include one or more program modules. For example, the candidate exploratory action determination engine 102 may include one or more feature subspace determination module(s) 114 and one or more value/cost estimation modules 116. Each such module may include computer-executable instructions, code, or the like that responsive to execution by a processing circuit may cause one or more particular tasks or operations to be performed. It should be appreciated that, while not depicted in FIG. 1, any of the engines of the outlier detection system 100 may include any number of modules or sub-modules. Further, at times herein, the terms engine, module, or program module may be used interchangeably.

In accordance with example embodiments of the disclosure, the candidate exploratory action determination engine 102 may receive a dataset 110 and a set of outlier detection algorithms as input. As used herein, the term set refers to a collection of elements without any implication as to order of the elements. The dataset 110 may include a collection of data points. One or more of the data points in the dataset 110 may be outliers. An outlier may be a data point that deviates significantly enough (e.g., by more than a threshold value) from other data points so as to indicate that the data point was generated by a different underlying mechanism than the other data points.

The dataset 110 may include data points relating to various attributes (also referred herein to as features). Referring now to FIGS. 1 and 2 in conjunction with one another, at block 202 of method 200, the candidate exploratory action determination engine 102 may determine feature subspaces from the dataset 110. At block 204, the candidate exploratory action determination engine 102 may determine a set of parameterized outlier detection algorithm instances. At block 206, the candidate exploratory action determination engine 102 may determine a set of candidate exploratory actions 118, where each candidate exploratory action 118 is a combination of a specific feature subspace with a specific parameterized instance of an outlier detection algorithm 112.

More specifically, at block 202, computer-executable instructions, code, or the like of the feature subspace determination module(s) 114 may be executed to determine feature subspaces from the dataset 110. The feature subspace determination module(s) 114 may be configured to determine the feature subspaces by performing unsupervised redundancy measurement and unsupervised relevance measurement. Unsupervised redundancy measurement may include the use of mutual information for discrete features and the use of statistical correlation for continuous features to determine the extent to which features are correlated. For example, a Pearson product-moment correlation coefficient (or any other suitable type of metric) may be determined for continuous features. A Pearson correlation coefficient may measure the linear correlation between two features X and Y, ranging from 1 to −1, where 1, 0, and −1 denote total positive correlation, no correlation, and total negative correlation, respectively. A Pearson correlation coefficient may be given by the cov (X, Y)/$\sigma_X \sigma_Y$, where cov is the covariance and $\sigma_X$ is the standard deviation of X.

Unsupervised relevance measurement may include quantifying the relevance of each feature. For example, a Laplacian score may be determined for each feature, and the features may be ranked according to their respective Laplacian scores. The Laplacian score for a feature may be computed based on Laplacian Eigenmaps and Locality Preserving Projection, in order to capture its locality preserving ability. More specifically, give the dataset 110 as input, the feature subspace determination module(s) 114 may be configured to construct a nearest neighbor graph with nodes as data points and edges connecting nearby data points to one another. The feature subspace determination module(s) 114 may be further configured to compute the weight matrix $S_{ij}$ of the graph to evaluate the similarity of each node pair (i,j) and model the local structure of the data space. Formally, unsupervised relevance measurement may be defined as follows: given a set of features F={$f_c$}, the Laplacian score of feature c may be defined by $L_c = (\Sigma_{ij}(f_{ci} - f_{cj})^2 S_{ij})/Var(f_c)$, where $f_{ci}$ is the value of the feature c in the data point i and $Var(f_c)$ is the variance of feature c. In certain example embodiments, features that do not preserve locality may be better suited for outlier detection.

After the unsupervised redundancy measurement and unsupervised relevance measurement is performed, computer-executable instructions, code, or the like of the feature subspace determination module(s) 114 may be executed at block 202 of method 200 to perform redundancy elimination operations and Laplacian selection operations to ultimately obtain the set of feature subspaces. More specifically, the redundancy elimination operations may include identifying highly-correlated feature pairs using the pair-wise Pearson correlation computed between features. Highly-correlated feature pairs may include feature pairs with absolute values of Pearson correlation coefficients that satisfy a threshold value t. The feature with the larger mean absolute correlation may then be selected from each highly-correlated feature pair. Mean absolute correlation of a feature may be defined as the average of the absolute value of the Pearson correlation coefficient of the feature with all other features. The threshold value t may be specified based on the level of redundancy elimination that is desired. Further, throughout this disclosure, a first value may satisfy a second value if the first value meets or exceeds the second value or if the first value meets or falls below the second value, depending on the implementation.

The redundancy elimination operations may result in a set of non-redundant features having size s (e.g., s may represent the number of non-redundant features). The feature subspace determination module(s) 114 may be configured to determine the feature subspaces from the set of non-redundant features by performing the Laplacian selection operations. The Laplacian selection operations may include ranking the set of non-redundant features based on their respective Laplacian scores to obtain s feature subspaces. The kth feature subspace may contain the top-K ranked features according to their Laplacian scores.

The set of feature subspaces obtained as a result of the Laplacian selection operations may be referred to as prioritized feature subspaces. In certain example embodiments, various features may be selected at random from the set of non-redundant features to obtain one or more non-prioritized feature subspaces in addition to the prioritized feature subspaces. Selecting non-prioritized features subspaces in addition to prioritized feature subspaces may allow for random exploration of the features, which may improve the efficiency of detecting outliers in the dataset 110. The above-described redundancy elimination operations may be performed for different threshold values t to obtain additional non-prioritized feature subspaces.

At block 204 of method 200, computer-executable instructions, code, or the like of the candidate exploratory action determination engine 102 may be executed to determine a set of parameterized instances of the outlier detection algorithms 112. For example, for each outlier detection algorithm 112, one or more sets of parameters may be determined, where each set of parameters corresponds to a particular parameterized instance of the outlier detection algorithm 112.

At block 206 of method 200, computer-executable instructions, code, or the like of the candidate exploratory action determination engine 102 may be executed to determine the set of candidate exploratory actions 118. The set of candidate exploratory actions 118 may be determined by taking a Cartesian product of the set of feature subspaces and the set of parameterized instances of outlier detection algorithms 112. Thus, each candidate exploratory action 118 may be a specific combination of a particular feature subspace and a particular parameterized instance of an outlier detection algorithm.

At block 208 of method 200, computer-executable instructions, code, or the like of the value/cost estimation module(s) 116 may be executed to compute value and cost estimates for each candidate exploratory action 118. The value of a candidate exploratory action 118 may be a measure of the accuracy of the candidate exploratory action 118 in identifying outliers. A linear regression model may be used to predict the accuracy of a candidate exploratory action 118. The inputs to the linear regression model may be properties of the feature subspace of a candidate exploratory action 118 and properties of the parameterized outlier detection algorithm instance of the candidate exploratory action 118. The linear regression model may be trained using historical anomaly detection datasets whose accuracy can be quantified.

The properties of a feature subspace that may be provided as input to the above-described linear regression model may include descriptive summaries of column-wise statistics computed from the dataset 110. The dataset 110 may be column-normalized to ensure comparability between statistics. As an example statistic that may be computed, the value/cost estimation module(s) 116 may be configured to compute the column-wise standard deviation from the dataset 110 for each feature in a feature subspace. The value/cost estimation module(s) 116 may be further configured to collect the computed column-wise statistics across all features in the feature subspace and compute summaries of the column statistics that represent the statistical properties of the entire feature subspace. The summaries may include mean, median, mode, min, max, skew, kurtosis, standard error, or the like. The above-described process may be repeated for other statistics as well including, without limitation, the column-wise Laplacian score, column-wise skewness, column-wise kurtosis, column-wise entropy, or the like.

In addition, at block 208, computer-executable instructions, code, or the like of the value/cost estimation module(s) 116 may be executed to cause operations to be performed for determining an estimated cost of execution for each candidate exploratory action 118. In certain example embodiments, a linear regression model may be generated for each outlier detection algorithm 112 in order to determine the cost of each candidate exploratory action 118. The cost of a candidate exploratory action 118 may be defined, at least in part, in terms of the execution time required to execute the parameterized outlier detection algorithm instance of the candidate exploratory action 118 on the feature subspace of the candidate exploratory action 118.

The time cost of executing an algorithm on the dataset 110 may be a function of both the size of the dataset 110 and the specific parameters of the algorithm that impact the algorithm's execution time complexity. For example, in the case of the local outlier factor (LOF) algorithm, the number of nearest neighbors l—which is used as an internal parameter of the algorithm—has an impact on execution of the algorithm. In certain example embodiments, the linear regression model used to determine the cost of a candidate exploratory action 118 may receive as inputs: 1) M—the number of data rows in the dataset 110, 2) N—the number of data columns in the dataset 110, and 3) $l_1, l_2, \ldots, l_i$—the relevant parameters of an outlier detection algorithm 112 that impact its execution time. The linear regression model for determining the cost of a candidate exploratory action 118 may then be represented by the following polynomial basis function: $\Sigma_{\gamma=1}^{n}(l_1 + \ldots + l_i + \log M + \log N + \log(l_1) + \ldots + \log(l_i))^{\gamma}$. The exponent n may be any integer greater than or equal to 1, and in certain example embodiments, $n \geq 3$ may be sufficient to include the complexity terms of nearly all outlier detection algorithms.

The candidate exploratory action determination engine 102 may provide the value and cost estimates computed for each candidate exploratory action 118 along with an indication of the specific combination of feature subspace and parameterized outlier detection algorithm instance that forms each candidate exploratory action 118 as input to the exploration engine 104. The exploration engine 104 may include computer-executable instructions, code, or the like that responsive to execution may cause operations to be performed for determining a set of optimal exploratory actions 122 to recommend for execution from among the set of candidate exploratory actions 118. An optimal exploratory action 122 may also be referred to herein interchangeably as a recommended exploratory action. The exploration engine 104 may determine the set of optimal exploratory actions 122 by solving an optimization problem. More specifically, the set of optimal exploratory actions 122 may be a solution to an optimization problem that maximizes values, minimizes costs, and diversifies the exploratory actions to be executed.

In certain example embodiments, the solution to the optimization problem may be a binary indicator matrix y. For example, under a formal construction of the optimization problem, let S be the set of all feature subspaces, U the subset of all prioritized feature subspaces, $S_i$ the ith feature subspace, where $1 \leq j \leq |S|$, and A the set of parameterized instances of the outlier detection algorithms 112, where $A_j$ is the jth parameterized instance and $1 \leq j \leq |A|$. Further, let (i,j) represent a candidate exploratory action 118, where $v_{i,j}$ and $w_{i,j}$ are its value and cost, respectively.

The optimization problem may then be defined as follows:

$$\max_{y} F(y) = \Sigma_{i \in S} \Sigma_{j \in A} z_{i,j} v_{i,j} + \lambda \Sigma_{i \in S} \Sigma_{j \in A} y_{i,j} v_{i,j},$$

where $\lambda$ is a parameter representing the weight of total values of budgeted recommendation compared to total values of top-K recommendation. The optimization problem formalized above may be solved under the following constraints: constraint 1: $y_{i,j} \in \{0, 1\}$; constraint 2: $\Sigma_{i \in S} \Sigma_{j \in A} y_{i,j} w_{i,j} \leq T_1$; constraint 3: $\forall j \in A \Sigma_{i \in S} y_{i,j} w_{i,j} \geq T_2$; constraint 4: $\forall i \in U \Sigma_{j \in A} y_{i,j} w_{i,j} \geq T_3$; constraint 5: $z_{i,j} \in \{0, 1\}$; constraint 6: $\Sigma_{i \in S} \Sigma_{j \in A} z_{i,j} \leq K$; and constraint 7: $\forall i \in S, \forall j \in A: z_{i,j} \leq y_{i,j}$. In constraint 1, $y = \{0, 1\}^{|S| \times |A|}$ is a binary $|S| \times |A|$ matrix, where $y_{i,j}=1$ indicates that (i,j) is selected for inclusion in the set of optimal exploratory actions 122 and $y_{i,j}=0$ indicates that (i,j) is not selected as an optimal exploratory action 122. Constraint 2 indicates that the total exploration budget is $T_1$. Constraint 3 provides algorithm diversity, with $T_2$ being the minimum time assignment for each parameterized instance of an outlier detection algorithm 112. Constraint 4 provides feature subspace diversity, with $T_3$ being the minimum time assignment for each prioritized feature subspace. In constraint 5, $z=\{0,1\}^{|S| \times |A|}$ is a binary $|S| \times |A|$ matrix, representing the top-K recommendations. Constraints 6 and 7 along with the objective function to be optimized serve to jointly model both top-K as well as budgeted recommendation within one unified recommendation objective. In particular, constraints 6 and 7 along with the objective function have the effect of setting the z variables for the top-K highest valued exploratory actions to 1 and other z variables to 0. The above-described formal representation of the optimization problem is a non-convex 0-1 integer programming problem whose solution is the set of optimal exploratory actions 122. It should be appreciated that the above-described formal representation of the optimization problem is merely illustrative and not exhaustive. The optimization problem solved by the exploration engine 104 to determine the set of optimal exploratory actions 122 may be represented using any suitable mathematical formulation and any suitable number or type of constraints such that the solution serves to maximize values, minimize costs, and ensure suitable diversity in the set of optimal exploratory actions 122 to be executed.

Referring now to FIGS. 1 and 3 in conjunction with one another, the set of optimal exploratory actions 122 may be provided as input to the exploratory action execution engine 106. At block 302 of method 300, computer-executable instructions, code, or the like of the exploratory action execution engine 106 may be executed to cause the set of optimal exploratory actions 122 to be executed. Execution of an exploratory action may include executing the parameterized outlier detection algorithm instance of the exploratory action on the feature subspace of the exploratory action to obtain outlier data. In particular, execution of each optimal exploratory action 122 may produce outlier data 124 that identifies one or more data points of the dataset 110 as outliers. The outlier data 124 may include a respective set of outlier scores for each optimal exploratory action 122 that is executed, where each respective set of outlier scores is representative of the outliers identified based on execution of the corresponding optimal exploratory action 122.

The outlier data 124 may be provided as input to the outlier data processing engine 108. At block 304 of method 300, computer-executable instructions, code, or the like of the outlier data processing engine 108 may be executed to generate one or more outlier views from the outlier data 124. In certain example embodiments, execution of different exploratory actions may result in the identification of different outliers. Thus, the outlier data processing engine 108 may be configured to combine potentially divergent outlier data obtained from execution of different optimal exploratory actions 122 into one or more outlier views 126. The results in each outlier view may be co-clustered such that within a given view, all of the exploratory actions characterize the same data points as outliers. There may, however, be disagreement across outlier views as to the characterization of data points as outliers. At block 306 of method 300, computer-executable instructions, code, or the like of the outlier data processing engine 108 may be executed to present the outlier view(s) 126 via one or more user interfaces 128.

In certain example embodiments, a non-negative matrix factorization based ensemble (NMFE) technique may be used to combine the outlier data 124 from execution of the set of optimal exploratory actions 122 into one or more co-clustered outlier views. Formally, let $\sigma_{r,d}$ be the outlier score for a data sample d (e.g., the dataset 110) resulting from execution of exploratory action r (e.g., one of the optimal exploratory actions 122). Given the matrix of outlier scores $\Delta$ with size R×D, where D is the number of data samples and R is the number of exploratory actions that are executed. The matrix of outlier scores $\Delta$ may be normalized such that the scores within each column each lie between 0 and 1.

Rather than presenting all R columns to a user, the outlier data processing engine 108 may be configured to implement an NMFE technique to combine the normalized outlier scores in the R columns into the one or more outlier views 126. More specifically, the outlier data processing engine 108 may use the rank-K non-negative matrix factorization to factorize $\Delta \approx UV^T$, where $U \in R^{R \times K}$ and $V \in R^{D \times K}$, by minimizing the Kullback-Leibler divergence between $\Delta$ and $UV^T$ as follows:

$$\max_{U, V \geq 0} \Sigma_{r,d} \sigma_{r,d} \log(\sigma_{r,d} / (u_{r,*} v_{d,*})) - \sigma_{r,d} + u_{r,*} v_{d,*}$$

The $\Delta$ matrix by definition can be expressed as a sum of K rank-1 matrices. Each of these rank-1 matrices may form a particular outlier view 126. A rank-1 matrix may correspond to optimal exploratory actions 122 that agree on their characterizations of the outliers (modulo a multiplicative factor). It should be appreciated that setting K=1 results in a direct averaging of the outlier scores resulting from execution of different optimal exploratory actions 122.

Example embodiments of the disclosure include or yield various technical features, technical effects, and/or improvements to technology. Example embodiments of the disclosure provide an unsupervised methodology for determining feature subspaces, combining feature subspaces with parameterized instances of outlier detection algorithms to obtain candidate exploratory actions, determining value and cost estimates for each candidate exploratory action, and solving an optimization problem to determine a set of optimal exploratory actions from the set of candidate exploratory actions. Each of these aspects of the disclosure constitutes technical features that yield the technical effect of automated outlier detection. As a result of these technical features and technical effects, an automated outlier detection system in accordance with example embodiments of the disclosure represents an improvement to existing outlier detection technology by providing a mechanism by which optimal exploratory actions can be identified, whose exploration has the greatest likelihood of yielding accurate outlier detection within specified time and budget constraints. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Illustrative Networked Architecture

Figure 4:
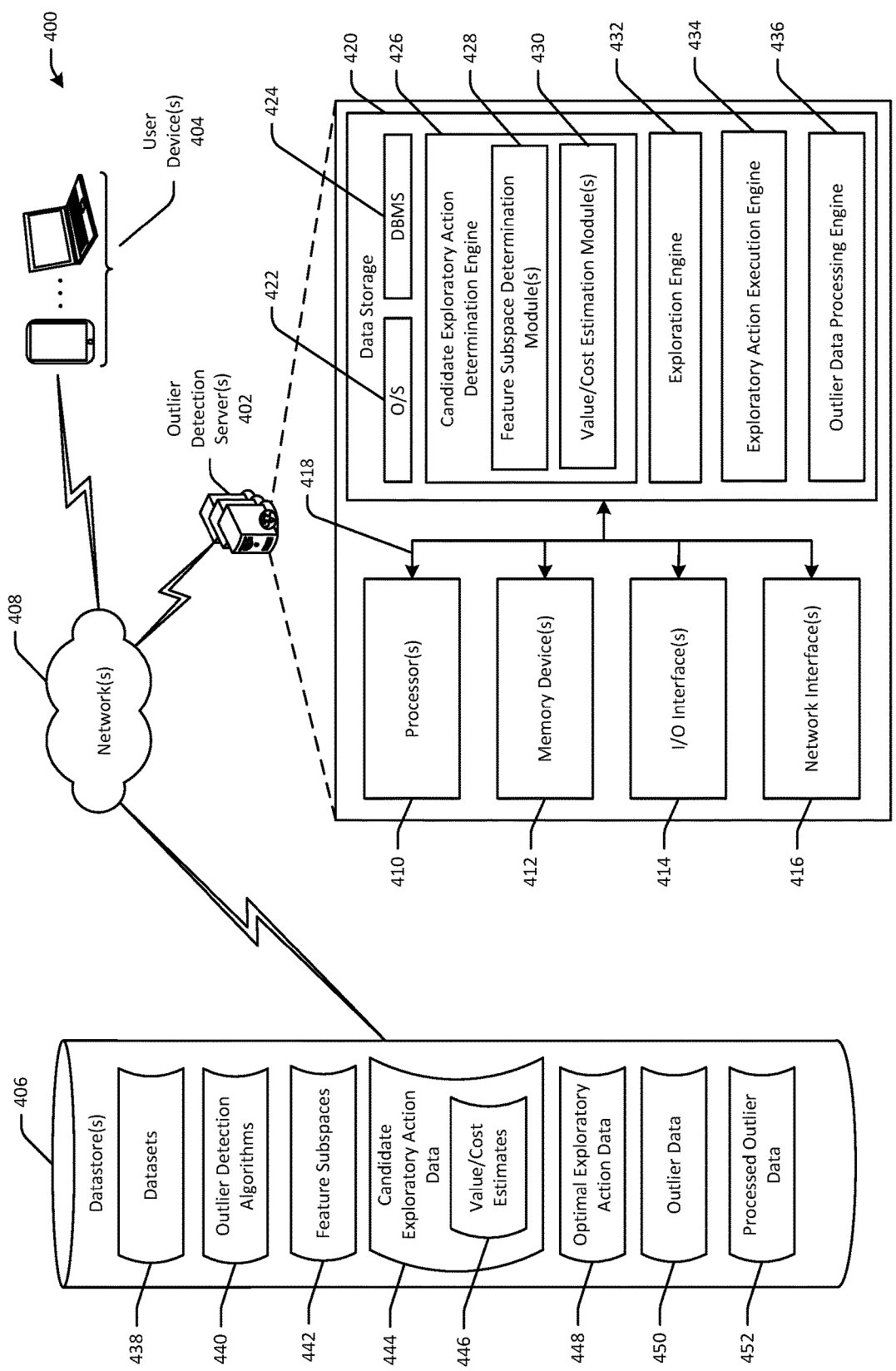
FIG. 4 is a schematic diagram of an illustrative networked architecture in accordance with one or more example embodiments of the disclosure.

FIG. 4 is a schematic diagram of an illustrative networked architecture 400 in accordance with one or more example embodiments of the disclosure. The networked architecture 400 may include one or more outlier detection servers 402, one or more user devices 404, and one or more datastores 406. The outlier detection system 100 depicted in FIG. 1 may include the outlier detection server(s) 402, and the engines and modules depicted as part of the outlier detection system 100 may reside on one or more of the outlier detection server(s) 402. While the outlier detection server(s) 402, the user device(s) 404, and the datastore(s) 406 may be described herein in the singular, it should be appreciated that multiple ones of any of the components of the architecture 400 may be provided.

The various components of the architecture 400 may be configured to communicate via one or more networks 408. The network(s) 408 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 408 may have any suitable communication range associated therewith and may include, for example, global networks (e.g., the Internet), metropolitan area networks (MANs), wide area networks (WANs), local area networks (LANs), or personal area networks (PANs). In addition, the network(s) 408 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the outlier detection server 402 may include one or more processors (processor(s)) 410, one or more memory devices 412 (generically referred to herein as memory 412), one or more input/output ("I/O") interface(s) 414, one or more network interfaces 416, and data storage 420. The may further include one or more buses 418 that functionally couple various components of the outlier detection server 402.

The bus(es) 418 may include at least one of a system bus, a memory bus, an address bus, or a message bus, and may permit exchange of information (e.g., data (including computer-executable code), signaling, etc.) between various components of the outlier detection server 402. The bus(es) 418 may include, without limitation, a memory bus or a memory controller, a peripheral bus, an accelerated graphics port, and so forth. The bus(es) 418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 412 of the outlier detection server 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 412 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 412 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 420 may include removable storage and/or non-removable storage including, but not limited to, magnetic storage, optical disk storage, and/or tape storage. The data storage 420 may provide non-volatile storage of computer-executable instructions and other data. The memory 412 and the data storage 420, removable and/or non-removable, are examples of computer-readable storage media (CRSM) as that term is used herein.

The data storage 420 may store computer-executable code, instructions, or the like that may be loadable into the memory 412 and executable by the processor(s) 410 to cause the processor(s) 410 to perform or initiate various operations. The data storage 420 may additionally store data that may be copied to memory 412 for use by the processor(s)

410 during the execution of the computer-executable instructions. Moreover, output data generated as a result of execution of the computer-executable instructions by the processor(s) 410 may be stored initially in memory 412, and may ultimately be copied to data storage 420 for non-volatile storage.

More specifically, the data storage 420 may store one or more operating systems (O/S) 422; one or more database management systems (DBMS) 424; and one or more program modules, applications, engines, computer-executable code, scripts, or the like such as, for example, a candidate exploratory action determination engine 426, an exploration engine 432, an exploratory action execution engine 434, and an outlier data processing engine 436. One or more engines of the outlier detection server 402 may include one or more program modules configured to be executed to perform more specialized tasks. For example, the candidate exploratory action determination engine 426 may include one or more feature subspace determination modules 428 and one or more value/cost estimation modules 430. Any of the components depicted as being stored in data storage 420 may include any combination of software, firmware, and/or hardware. The software and/or firmware may include computer-executable code, instructions, or the like that may be loaded into the memory 414 for execution by one or more of the processor(s) 412 to perform any of the operations described earlier in connection with correspondingly named engines or modules.

Although not depicted in FIG. 4, the data storage 420 may further store various types of data utilized by components of the outlier detection server 402 (e.g., any of the data depicted as being stored in the datastore(s) 406). Any data stored in the data storage 420 may be loaded into the memory 412 for use by the processor(s) 410 in executing computer-executable code. In addition, any data depicted as being stored in the data storage 420 may potentially be stored in one or more of the datastore(s) 406 and may be accessed via the DBMS 424 and loaded in the memory 412 for use by the processor(s) 410 in executing computer-executable instructions, code, or the like.

The processor(s) 410 may be configured to access the memory 412 and execute computer-executable instructions loaded therein. For example, the processor(s) 410 may be configured to execute computer-executable instructions of the various program modules, applications, engines, or the like of the outlier detection server 402 to cause or facilitate various operations to be performed in accordance with one or more embodiments of the disclosure. The processor(s) 410 may include any suitable processing unit capable of accepting data as input, processing the input data in accordance with stored computer-executable instructions, and generating output data. The processor(s) 410 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 410 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 410 may be capable of supporting any of a variety of instruction sets.

Referring now to other illustrative components depicted as being stored in the data storage 420, the O/S 422 may be loaded from the data storage 420 into the memory 412 and may provide an interface between other application software executing on the outlier detection server 402 and hardware resources of the outlier detection server 402. More specifically, the O/S 422 may include a set of computer-executable instructions for managing hardware resources of the outlier detection server 402 and for providing common services to other application programs (e.g., managing memory allocation among various application programs). In certain example embodiments, the O/S 422 may control execution of one or more of the program modules depicted as being stored in the data storage 420. The O/S 422 may include any operating system now known or which may be developed in the future including, but not limited to, any server operating system, any mainframe operating system, or any other proprietary or non-proprietary operating system.

The DBMS 424 may be loaded into the memory 412 and may support functionality for accessing, retrieving, storing, and/or manipulating data stored in the memory 412 and/or data stored in the data storage 420. The DBMS 424 may use any of a variety of database models (e.g., relational model, object model, etc.) and may support any of a variety of query languages. The DBMS 424 may access data represented in one or more data schemas and stored in any suitable data repository. In certain example embodiments, the DBMS 424 may be any suitable light-weight DBMS optimized for performance on a mobile device.

The datastore(s) 406 may include, but are not limited to, databases (e.g., relational, object-oriented, etc.), file systems, flat files, distributed datastores in which data is stored on more than one node of a computer network, peer-to-peer network datastores, or the like. The datastore(s) 406 may store various types of data including, without limitation, datasets 438 (which may include the dataset 110 depicted in FIG. 1); outlier detection algorithm 440 (which may include, for example, parameterized instances of the outlier detection algorithms 112); feature subspace data 442 (e.g., data indicative of correlation coefficients determined for pair-wise features, threshold values for determining highly-correlated feature pairs, data indicative of prioritized and/or non-prioritized feature subspaces, etc.); candidate exploratory action data 444 (which may include an identification of the feature subspace and parameterized outlier detection algorithm instance that constitutes each candidate exploratory action 118 and which may further include value and cost estimates 446 for each candidate exploratory action 118); optimal exploratory action data 448 (which may include an identification of the set of optimal exploratory actions 122, data indicative of the optimization problem to be solved, data indicative of constraints under which the optimization problem is to be solved, etc.); outlier data 448 (which may include the outlier scores generated as a result of execution of the optimal exploratory actions 122); and processed outlier data 452 (which may include the outlier view(s) 126 to be presented in one or more user interfaces via a user device 404). While the datastore(s) 406 are depicted in FIG. 4 as being accessible via the network(s) 408, it should be appreciated that, in certain example embodiments, any of the datastore(s) 406 and/or any of the data depicted as residing thereon may additionally, or alternatively, be stored in locally in the data storage 420.

Referring now to other illustrative components of the outlier detection server 402, the input/output (I/O) interface(s) 414 may facilitate the receipt of input information by the outlier detection server 402 from one or more I/O devices as well as the output of information from the outlier detection server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the outlier detection server 402 or may be separate. The I/O devices may further include, for example, any number of peripheral devices such as data storage devices, printing devices, and so forth.

The I/O interface(s) 414 may also include an interface for an external peripheral device connection such as universal serial bus (USB), FireWire, Thunderbolt, Ethernet port or other connection protocol that may connect to one or more networks. The I/O interface(s) 414 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The outlier detection server 402 may further include one or more network interfaces 416 via which the outlier detection server 402 may communicate with any of a variety of other systems, platforms, networks, devices, and so forth. The network interface(s) 416 may enable communication, for example, with the datastore(s) 406 and/or the user device(s) 404 via one or more of the network(s) 408.

It should be appreciated that the engines/modules depicted in FIG. 4 as being stored in the data storage 420 (or depicted in FIG. 1 more generally as part of the outlier detection system 100) are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the outlier detection server 402 and/or hosted on other computing device(s) accessible via one or more of the network(s) 408, may be provided to support functionality provided by the engines/modules depicted in FIGS. 1 and 4 and/or additional or alternate functionality. Further, functionality may be modularized differently such that processing described as being supported collectively by the collection of engines/modules depicted in FIGS. 1 and 4 may be performed by a fewer or greater number of engines or program modules, or functionality described as being supported by any particular engine or module may be supported, at least in part, by another engine or program module. In addition, engines or program modules that support the functionality described herein may form part of one or more applications executable across any number of devices of the outlier detection server 402 in accordance with any suitable computing model such as, for example, a client-server model, a peer-to-peer model, and so forth. In addition, any of the functionality described as being supported by any of the engines/modules depicted in FIGS. 1 and 4 may be implemented, at least partially, in hardware and/or firmware across any number of devices.

It should further be appreciated that the outlier detection server 402 may include alternate and/or additional hardware, software, or firmware components beyond those described or depicted without departing from the scope of the disclosure. More particularly, it should be appreciated that software, firmware, or hardware components depicted as forming part of the outlier detection server 402 are merely illustrative and that some components may not be present or additional components may be provided in various embodiments. While various illustrative engines/modules have been depicted and described as software engines or program modules stored in data storage 420, it should be appreciated that functionality described as being supported by the engines or modules may be enabled by any combination of hardware, software, and/or firmware. It should further be appreciated that each of the above-mentioned engines or modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional engines or modules not depicted may be present and may support at least a portion of the described functionality and/or additional functionality. Moreover, while certain engines modules may be depicted or described as sub-engines or sub-modules of another engine or module, in certain embodiments, such engines or modules may be provided as independent engines or modules or as sub-engines or sub-modules of other engines or modules.

One or more operations of the methods 200 or 300 may be performed by an outlier detection server 402 having the illustrative configuration depicted in FIG. 4, or more specifically, by one or more engines, program modules, applications, or the like executable on such device(s). It should be appreciated, however, that such operations may be implemented in connection with numerous other system configurations.

The operations described and depicted in the illustrative methods of FIGS. 2 and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2 and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   determining, by a computer processor, a set of one or more features associated with a dataset;
   determining, by the computer processor, a set of feature subspaces, wherein each feature subspace comprises a respective at least one feature from the set of one or more features;
   determining, by the computer processor, a set of candidate exploratory actions, wherein each candidate exploratory action comprises a respective feature subspace and a respective instance of a respective outlier detection algorithm;
   determining, by the computer processor, an optimal subset of exploratory actions from the set of candidate exploratory actions, the optimal subset comprising a first exploratory action and a second exploratory action;
   executing, by the computer processor, the first exploratory action in the optimal subset to obtain a first portion of outlier data;
   executing, by the computer processor, the second exploratory action in the optimal subset to obtain a second portion of the outlier data;
   processing, by the computer processor, the outlier data to obtain one or more outlier views, wherein processing the outlier data comprises generating a first outlier view for the first portion of the outlier data and a second different outlier view for the second portion of the outlier data if the first portion of the outlier data indicates a different characterization of outliers in the dataset than the second portion of the outlier data or processing the outlier data comprises generating a same outlier view for the first portion of the outlier data and the second portion of the outlier data if the first portion of the outlier data indicates a same characterization of the outliers in the dataset as the second portion of the outlier data; and
   presenting, by the computer processor, the one or more outlier views via one or more user interfaces.

2. The method of claim 1, wherein the set of one or more features is a plurality of features comprising a plurality of non-redundant features including a first feature and a second feature and the set of one or more feature subspaces is a plurality of features subspaces including a first feature subspace and a second feature subspace, and wherein determining the plurality of feature subspaces comprises:
   determining, by the computer processor, a first relevance metric for the first feature;
   determining, by the computer processor, a second relevance metric for the second feature;
   determining, by the computer processor, that the first relevance metric is greater than the second relevance metric;
   assigning, by the computer processor, a first rank to the first feature and a second rank to the second feature, wherein the first rank and the second rank together indicate that the first feature has greater relevance to the dataset than the second feature;
   determining, by the computer processor, that the first feature subspace includes only the first feature; and
   determining, by the computer processor, that the second feature subspace includes the first feature and the second feature.

3. The method of claim 2, wherein the plurality of features further comprises a third feature, the method further comprising:
   determining, by the computer processor, a correlation metric for a pair-wise combination of the first feature and the third feature;
   determining, by the computer processor, that the correlation metric satisfies a threshold value;
   determining, by the computer processor, that the third feature is more strongly correlated to at least the second feature;
   determining, by the computer processor, that the third feature is a redundant feature; and
   excluding, by the computer processor, the third feature from the plurality of non-redundant features.

4. The method of claim 3, wherein determining that the third feature is more strongly correlated to at least the second feature comprises:
   determining, by the computer processor, a first set of correlation metrics, each correlation metric in the first set corresponding to a respective pair-wise combination of the first feature with another feature in the plurality of features other than the third feature;
   determining, by the computer processor, a second set of correlation metrics, each correlation metric in the second set corresponding to a respective pair-wise combination of the third feature with another feature in the plurality of features other than the first feature;
   determining, by the computer processor, a first aggregate correlation metric from the first set of correlation metrics;
   determining, by the computer processor, a second aggregate correlation metric from the second set of correlation metrics; and
   determining, by the computer processor, that the second aggregate correlation metric is greater than the first aggregate correlation metric.

5. The method of claim 1, further comprising:
   determining, by the computer processor, a respective cost estimate for each candidate exploratory action; and
   determining, by the computer processor, a respective value estimate for each candidate exploratory action.

6. A system, comprising:
   at least one memory storing computer-executable instructions; and
   at least one processor configured to access the at least one memory and execute the computer-executable instructions to:
      determine a set of one or more features associated with a dataset;
      determine a set of one or more feature subspaces, wherein each feature subspace comprises a respective at least one feature from the set of one or more features;
      determine a set of candidate exploratory actions, wherein each candidate exploratory action comprises a respective feature subspace and a respective instance of a respective outlier detection algorithm;
      determine an optimal subset of exploratory actions from the set of candidate exploratory actions, the optimal subset comprising a first exploratory action and a second exploratory action;
      execute the first exploratory action in the optimal subset to obtain a first portion of outlier data;
      execute the second exploratory action in the optimal subset to obtain a second portion of the outlier data;

process the outlier data to obtain one or more outlier views, wherein processing the outlier data comprises generating a first outlier view for the first portion of the outlier data and a second different outlier view for the second portion of the outlier data if the first portion of the outlier data indicates a different characterization of outliers in the dataset than the second portion of the outlier data or processing the outlier data comprises generating a same outlier view for the first portion of the outlier data and the second portion of the outlier data if the first portion of the outlier data indicates a same characterization of the outliers in the dataset as the second portion of the outlier data; and present the one or more outlier views via one or more user interfaces.

7. The system of claim 6, wherein the set of one or more features is a plurality of features comprising a plurality of non-redundant features including a first feature and a second feature and the set of one or more feature subspaces is a plurality of features subspaces including a first feature subspace and a second feature subspace, and wherein the at least one processor is configured to determine the plurality of feature subspaces by executing the computer-executable instructions to:

determine a first relevance metric for the first feature;
determine a second relevance metric for the second feature;
determine that the first relevance metric is greater than the second relevance metric;
assign a first rank to the first feature and a second rank to the second feature, wherein the first rank and the second rank together indicate that the first feature has greater relevance to the dataset than the second feature;
determine that the first feature subspace includes only the first feature; and
determine that the second feature subspace includes the first feature and the second feature.

8. The system of claim 7, wherein the plurality of features further comprises a third feature, and wherein the at least one processor is further configured to execute the computer-executable instructions to:

determine a correlation metric for a pair-wise combination of the first feature and the third feature;
determine that the correlation metric satisfies a threshold value;
determine that the third feature is more strongly correlated to at least the second feature;
determine that the third feature is a redundant feature; and
exclude the third feature from the plurality of non-redundant features.

9. The system of claim 8, wherein the at least one processor is configured to determine that the third feature is more strongly correlated to at least the second feature by executing the computer-executable instructions to:

determine a first set of correlation metrics, each correlation metric in the first set corresponding to a respective pair-wise combination of the first feature with another feature in the plurality of features other than the third feature;
determine a second set of correlation metrics, each correlation metric in the second set corresponding to a respective pair-wise combination of the third feature with another feature in the plurality of features other than the first feature;
determine a first aggregate correlation metric from the first set of correlation metrics;
determine a second aggregate correlation metric from the second set of correlation metrics; and
determine that the second aggregate correlation metric is greater than the first aggregate correlation metric.

10. The system of claim 6, wherein the at least one processor is further configured to execute the computer-executable instructions to:

determine a respective cost estimate for each candidate exploratory action; and
determine a respective value estimate for each candidate exploratory action.

11. A computer program product comprising a non-transitory storage medium readable by a processing circuit, the storage medium storing instructions executable by the processing circuit to cause a method to be performed, the method comprising:

determining a set of one or more features associated with a dataset;
determining set of one or more feature subspaces, wherein each feature subspace comprises a respective at least one feature from the set of one or more features;
determining a set of candidate exploratory actions, wherein each candidate exploratory action comprises a respective feature subspace and a respective instance of a respective outlier detection algorithm;
determining an optimal subset of exploratory actions from the set of candidate exploratory actions, the optimal subset comprising a first exploratory action and a second exploratory action;
executing the first exploratory action in the optimal subset to obtain a first portion of outlier data;
executing the second exploratory action in the optimal subset to obtain a second portion of the outlier data;
processing the outlier data to obtain one or more outlier views, wherein processing the outlier data comprises generating a first outlier view for the first portion of the outlier data and a second different outlier view for the second portion of the outlier data if the first portion of the outlier data indicates a different characterization of outliers in the dataset than the second portion of the outlier data or processing the outlier data comprises generating a same outlier view for the first portion of the outlier data and the second portion of the outlier data if the first portion of the outlier data indicates a same characterization of the outliers in the dataset as the second portion of the outlier data; and
presenting the one or more outlier views via one or more user interfaces.

12. The computer program product of claim 11, wherein the set of one or more features is a plurality of features comprising a plurality of non-redundant features including a first feature and a second feature and the set of one or more feature subspaces is a plurality of features subspaces including a first feature subspace and a second feature subspace, and wherein determining the plurality of feature subspaces comprises:

determining a first relevance metric for the first feature;
determining a second relevance metric for the second feature;
determining that the first relevance metric is greater than the second relevance metric;
assigning a first rank to the first feature and a second rank to the second feature, wherein the first rank and the second rank together indicate that the first feature has greater relevance to the dataset than the second feature;
determining that the first feature subspace includes only the first feature; and determining that the second feature subspace includes the first feature and the second feature.

13. The computer program product of claim 12, wherein the plurality of features further comprises a third feature, the method further comprising:
- determining a correlation metric for a pair-wise combination of the first feature and the third feature;
- determining that the correlation metric satisfies a threshold value;
- determining that the third feature is more strongly correlated to at least the second feature;
- determining that the third feature is a redundant feature; and
- excluding the third feature from the plurality of non-redundant features.

14. The computer program product of claim 13, wherein determining that the third feature is more strongly correlated to at least the second feature comprises:
- determining a first set of correlation metrics, each correlation metric in the first set corresponding to a respective pair-wise combination of the first feature with another feature in the plurality of features other than the third feature;
- determining a second set of correlation metrics, each correlation metric in the second set corresponding to a respective pair-wise combination of the third feature with another feature in the plurality of features other than the first feature;
- determining a first aggregate correlation metric from the first set of correlation metrics;
- determining a second aggregate correlation metric from the second set of correlation metrics; and
- determining that the second aggregate correlation metric is greater than the first aggregate correlation metric.

15. The computer program product of claim 11, wherein the outlier data comprises a respective set of outlier scores for each of the first exploratory action and the second exploratory action.

* * * * *